United States Patent
Weston

(10) Patent No.: US 10,020,410 B1
(45) Date of Patent: Jul. 10, 2018

(54) SOLAR TILES AND ARRAYS

(71) Applicant: Mark William Weston, Bradenton, FL (US)

(72) Inventor: Mark William Weston, Bradenton, FL (US)

(73) Assignee: University of South Florida, Tampa, FL (US)

( * ) Notice: Subject to any disclaimer, the term of this patent is extended or adjusted under 35 U.S.C. 154(b) by 921 days.

(21) Appl. No.: 14/069,509

(22) Filed: Nov. 1, 2013

Related U.S. Application Data

(60) Provisional application No. 61/721,237, filed on Nov. 1, 2012.

(51) Int. Cl.
*H01L 31/042* (2014.01)

(52) U.S. Cl.
CPC ................................ *H01L 31/0422* (2013.01)

(58) Field of Classification Search
CPC ...... F24J 2/00; F24J 2/04; F24J 2/0422; F24J 2/0444; F24J 2/20; F24J 2/24
USPC ........ 126/569, 600, 631, 633, 634, 628, 684
See application file for complete search history.

(56) References Cited

U.S. PATENT DOCUMENTS

| | | | | |
|---|---|---|---|---|
| 2,857,634 A | * | 10/1958 | Garbade | E04B 7/163 119/437 |
| 3,935,897 A | | 2/1976 | Pulver | |
| 4,054,125 A | * | 10/1977 | Eckels | F24J 2/0433 126/633 |
| 4,080,221 A | * | 3/1978 | Manelas | F24J 2/10 126/684 |
| 4,191,165 A | | 3/1980 | Faudarole | |
| 4,203,487 A | | 5/1980 | Gartner | |
| 4,279,242 A | * | 7/1981 | Bogatzki | F24J 2/055 126/655 |
| 4,423,599 A | * | 1/1984 | Veale | F03G 6/065 126/584 |
| 4,456,208 A | | 6/1984 | MacConochie et al. | |
| 4,655,195 A | * | 4/1987 | Boynton | E06B 9/365 126/631 |
| 4,683,941 A | | 8/1987 | Timmer | |
| 5,373,838 A | * | 12/1994 | Ho | F24J 2/4647 126/569 |
| 5,572,988 A | * | 11/1996 | Walton | E04H 4/06 126/563 |
| 5,613,333 A | | 3/1997 | Witzig | |

(Continued)

OTHER PUBLICATIONS

Borden, G. P., & Meredith, M. (2012). "Matter: material processes in architectural production", London, Routledge, pp. 155-167.

(Continued)

*Primary Examiner* — Nathaniel Herzfeld
(74) *Attorney, Agent, or Firm* — Thomas | Horstemeyer, LLP

(57) ABSTRACT

In one embodiment, a solar tile includes a hollow body including a first half and a second half, the first half including a dark-colored side that is adapted to absorb solar energy and the second half including a light-colored side that is adapted to reflect solar energy, the first and second halves defining an open interior space through which heat exchange fluid can pass, and a central tube that enables the heat exchange fluid to enter or exit the interior space of the body, wherein the central tube also forms a central axis about which the tile can be rotated.

15 Claims, 4 Drawing Sheets

(56) References Cited

U.S. PATENT DOCUMENTS

| | | | | |
|---|---|---|---|---|
| 6,043,425 | A | * | 3/2000 | Assad ................ H01L 31/0547 |
| | | | | 136/246 |
| 6,670,540 | B2 | * | 12/2003 | Kular ................ H01L 31/0236 |
| | | | | 136/244 |
| 7,980,031 | B2 | | 7/2011 | O'Hagin |
| 8,347,877 | B2 | * | 1/2013 | Shabtay .................. F24J 2/245 |
| | | | | 126/600 |
| 8,640,690 | B2 | * | 2/2014 | McKinzie .............. F24J 2/0007 |
| | | | | 126/628 |
| 2007/0107884 | A1 | * | 5/2007 | Sirkar .................. F28D 7/1669 |
| | | | | 165/133 |
| 2008/0184789 | A1 | * | 8/2008 | Eck ........................ F03G 6/065 |
| | | | | 73/204.16 |
| 2008/0314443 | A1 | * | 12/2008 | Bonner ........... H01L 31/035281 |
| | | | | 136/255 |
| 2010/0019412 | A1 | | 1/2010 | Lane et al. |
| 2011/0000401 | A1 | | 1/2011 | Stratton et al. |
| 2011/0173908 | A1 | | 7/2011 | Kahle |

OTHER PUBLICATIONS

Neckel, Jr., "Developing of Ceramic Roof Tiles Process by Powder Pressing and Firing in Roller Kiln", Materials Science Forum vols. 591-593 (2008), pp. 521-525.

* cited by examiner

SOLAR TILES AND ARRAYS

CROSS-REFERENCE TO RELATED APPLICATION(S)

This application claims priority to U.S. Provisional Application Ser. No. 61/721,237, filed Nov. 1, 2012, which is hereby incorporated by reference herein in its entirety.

BACKGROUND

Solar shading is an essential component to good passive energy design for buildings. Traditionally, solar design has come in the form of static shading devices applied to building openings or integrated into building forms that provide shading through their basic shape and orientation. More preferable in many situations, however, would be adaptive solar shading that responds to lighting conditions, time of day, and the presence of building occupants.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Disclosed herein are solar tiles that can be used in adaptive solar shading applications. In some embodiments, the tiles comprise a first side having a surface that is adapted to absorb solar energy and a second side that is adapted to reflect solar energy. The tiles can be used to form solar arrays and can be arranged within the arrays to either absorb or reflect solar energy, depending upon their orientations. In some embodiments, the tiles are hollow so that a heat exchange fluid can be passed through the tiles of the array. In such a case, heat absorbed from the sun can be transferred into the heat exchange fluid.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
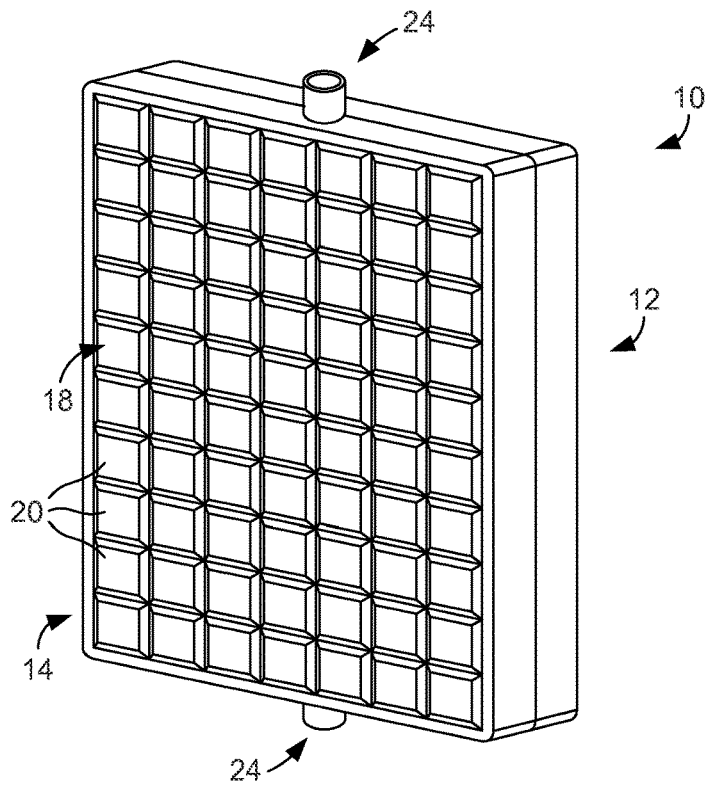
FIG. 1 is a first perspective view of an embodiment of a solar tile.
Figure 2:
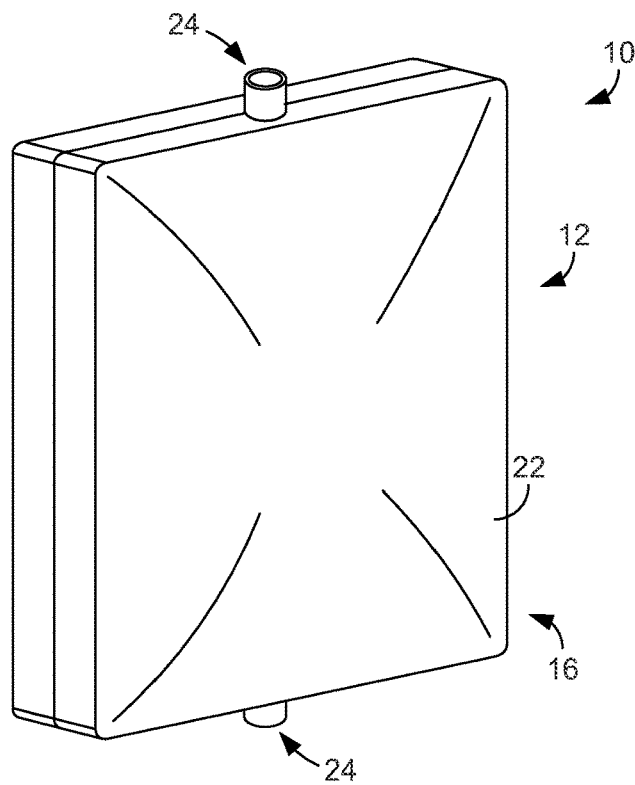
FIG. 2 is a second perspective view of the solar tile of FIG. 1.
Figure 3:
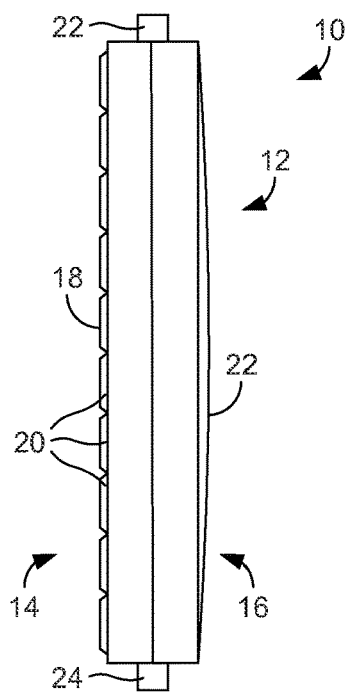
FIG. 3 is a side view of the solar tile of FIG. 1.

FIGS. 1-3 illustrate an example embodiment of a solar tile 10. As is shown in these figures, the tile 10 comprises a generally rectangular body 12 that has two opposed sides, including a first side 14 and a second side 16. The first side 14 has a rough outer surface 18 that increases the surface area of the first side. In the illustrated example, the outer surface 18 has a "waffle" pattern that is comprised of multiple protrusions 20 that extend outward. In the illustrated example, the protrusions 20 are generally rectangular and provided in aligned rows and columns. It is noted, however, that substantially any other shapes could be used to form the roughness of the outer surface 18. In addition to being rough, the outer surface 18 has a dark color (e.g., black) so that it absorbs solar energy well. Unlike that of the first side, the outer surface 22 of the second side 16 is smooth and has a light color (e.g., white) so that it reflects solar energy well. In some embodiments, the outer surface 22 is generally convex so that it bows outward (see FIG. 3). Notably, in some embodiments, the first side 14 can also have a generally convex shape.

As is apparent from the figures, the first and second sides 14, 16 can form first and second halves of the body 12. In some embodiments, the body 12 is generally square and has height and width dimensions on the order of several inches each. However, one or both of these dimensions can be either smaller or larger, depending upon the application and the desired result.

The first and second sides 14, 16 of the body 12 can be made from nearly any material. The material that is selected may depend upon the application in which the tile 10 is used. In some embodiments, the sides 14, 16 can be made from one or more of a metal material, a plastic material, a ceramic material, a glass material, and a composite material. In some embodiments, the second side 16 is made of or includes an insulating material.

Figure 4A:
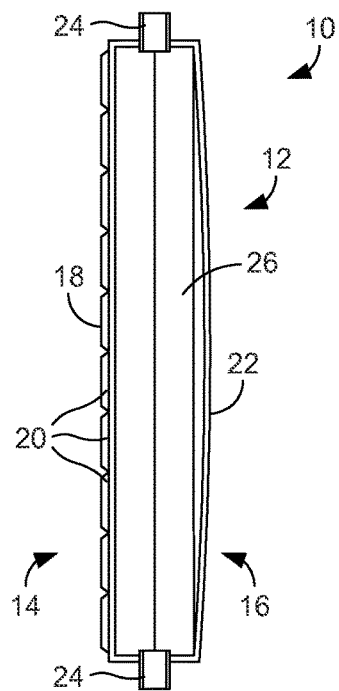
FIG. 4A is a cross-sectional side view of the solar tile of FIG. 1, illustrating a first internal configuration of the tile.
Figure 4B:
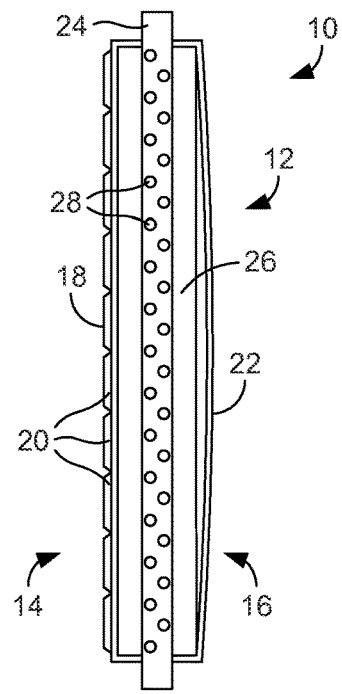
FIG. 4B is a cross-sectional side view of the solar tile of FIG. 1, illustrating a second internal configuration of the tile.

In some embodiments, the body 12 is hollow so as to define an interior space through which a heat exchange (e.g., water or oil) fluid can pass. FIGS. 4A and 4B show alternative configurations for the interior of a hollow tile 10. In the embodiment of FIG. 4A, the tile 10 comprises two relatively short central tubes 24 that are positioned at the centers of the top and bottom of the tile that provide access to an interior space 26 of the tile, which is formed by the two halves of the body. In such an embodiment, each of the tubes 24 can act as an inlet or an outlet that enables the heat exchange fluid to flow into and out of the interior space 26. In the embodiment of FIG. 4B, the tile 10 comprises a single relatively long central tube 24 that extends through the center of the tile from top to bottom. In this case, the tube 24 comprises one or more perforations 28 that enable the heat exchange fluid to flow into and out of the interior space 26. In addition to enabling the passage of heat transfer fluid, the tubes 24 can also define a central axis about which the tile 10 can be rotated to change its orientation relative to the position of the sun. In such a case, the tube 24 act as rotation shafts.

Figure 5:
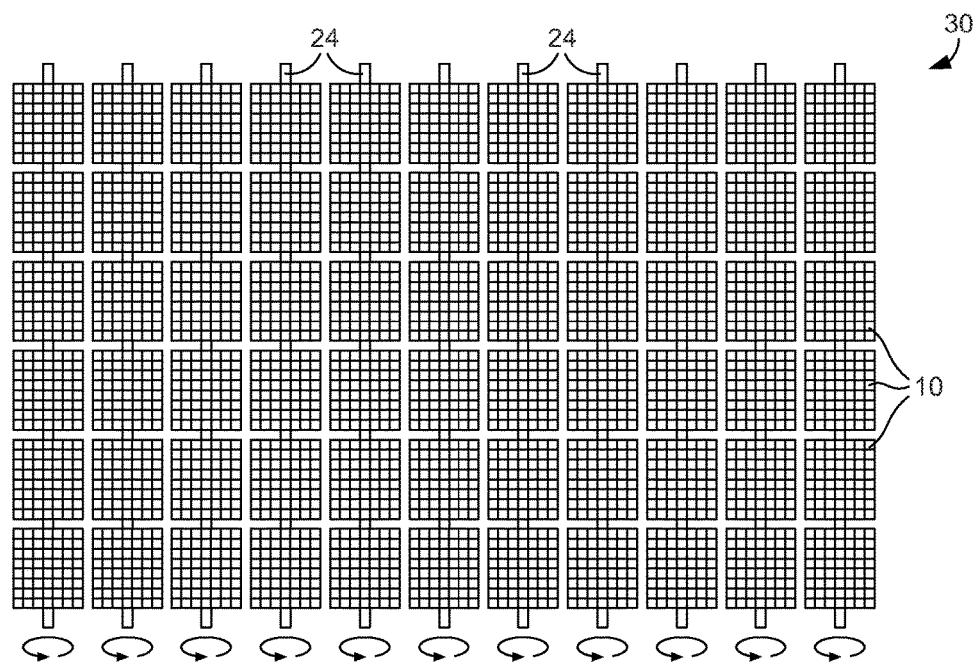
FIG. 5 is a front view of a first embodiment of a solar array that incorporates solar tiles.
Figure 6:
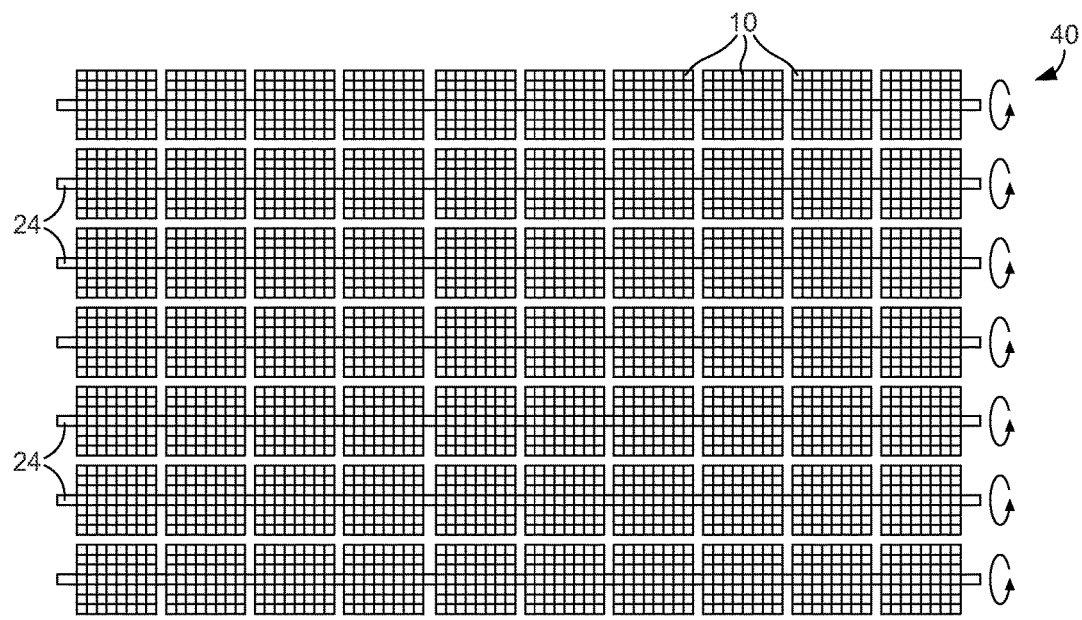
FIG. 6 is a front view of a second embodiment of a solar array that incorporates solar tiles.

Multiple solar tiles 10 can be used together to form a solar array, such as the arrays 30 and 40 shown in FIGS. 5 and 6. Beginning with FIG. 5, the array 30 comprises multiple tiles 10 that are arranged in multiple aligned parallel vertical columns. The tiles 10 of each column can connected together with one or more tubes 24 so that they form a continuous vertical path through which the heat exchange fluid can flow. The tiles 10 of any given column can, in some embodiments, be rotated in unison, as indicated by the arrows at the bottom of the figure. In other embodiments each tile 10 of the array 30 can be rotated, or otherwise modulated, independently.

Turning to FIG. 6, the array 40 is similar to the array 30 shown in FIG. 5. The array 40, however, comprises multiple tiles 10 that are arranged in multiple aligned parallel horizontal rows. The tiles 10 of each row can be connected together with one or more tubes 24 so that they form a continuous horizontal path through which the heat exchange fluid can flow. The tiles 10 of any given row can, in some embodiments, be rotated in unison, as indicated by the arrows at the right side of the figure. In some other embodiments each tile 10 of the array 40 can be rotated, or otherwise modulated, independently.

Figure 7:
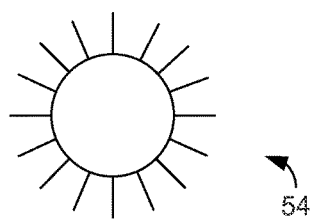
FIG. 7 is an illustration of an example application for a solar array.
Figure 7:
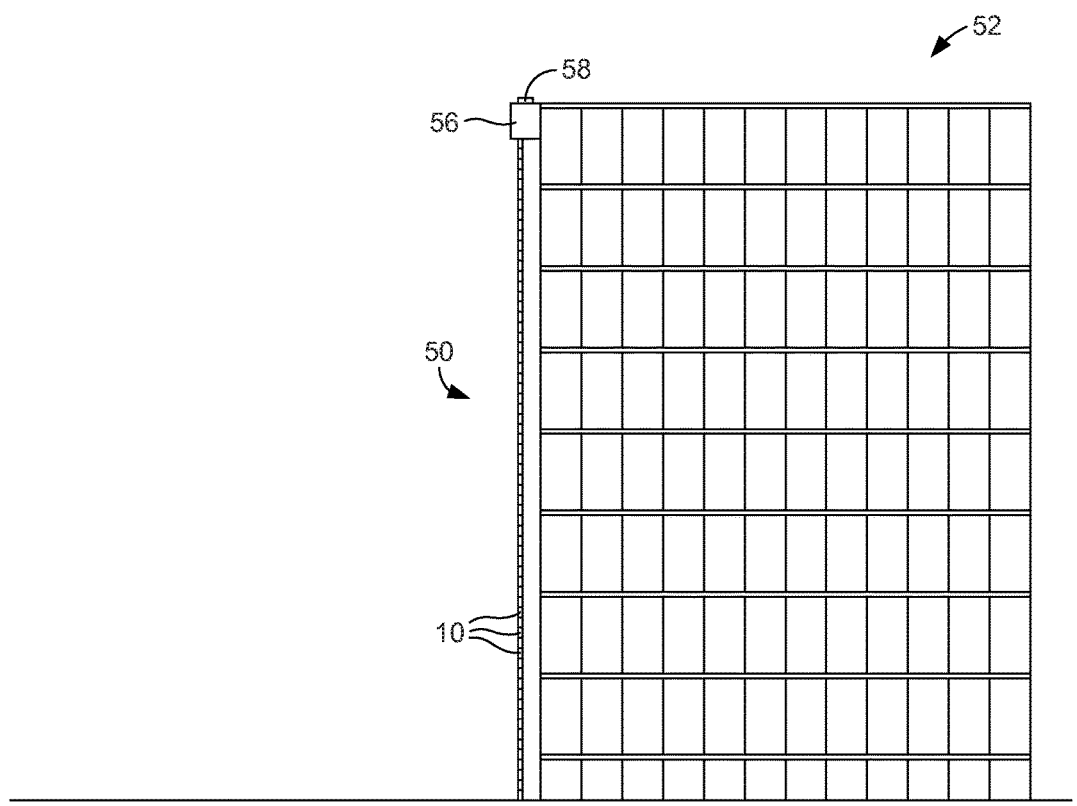

Arrays such as those illustrated in FIGS. 5 and 6 can be used in various applications. In one such application, an array can be positioned in front of a building in a solar shading application. FIG. 7 illustrates such an application. As is shown in this figure, an array 50 of tiles 10 is positioned in front of a side of a building 52 that faces the sun 54. In circumstances in which it is desired to reduce the heat load on the building 52, the tiles 10 of the array 50 can be oriented so that the smooth, light-colored sides 16 of the tiles face the sun 54. In cases in which the heat load is not that great, for instance in winter or on cloudy days, the tiles 10 of the array 50 can be oriented so that the side edges of the tiles face the sun, in which case direct or diffuse sunlight can pass through the array and onto the building 52. In circumstances in which it is desired to not only shield the building 52 from the sun 54 but also to collect solar energy, the tiles 10 of the array 50 can be oriented so that the rough, dark-colored sides 14 of the tiles face the sun 54. In such a case, the dark-colored sides 14 will absorb the sun's energy in the form of heat, which can be transferred into heat exchange fluid that passes through the tiles 10.

In some embodiments, the array 50 can be used as part of a system that automatically adapts to sense the position of the sun and/or ambient conditions and orients the tiles 10 in an optimal manner. Such a system could, for example, be used to cause the tiles 10 to track the changing position of the sun. In such a case, a motor 56 could be used to automatically rotate the tiles 10 responsive to light conditions that are measured by a light sensor 58.

Although the rough, dark-colored sides 14 of the tiles 10 can be used to collect heat energy, it is noted that they can also be used to dissipate heat energy. For instance, when the heat exchange fluid that flows through the tiles 10 is hotter than the ambient environment, the high surface area of the rough sides 14 can be used to radiate the heat within the fluid to the environment. Moreover, in cases in which the rough sides 14 of the tiles 10 are porous, heat dissipation can also be achieved through evaporative cooling (e.g., when the heat exchange fluid is water). This effect can be increased in cases in which the rough sides 14 of the tiles 10 face the sun. In such a case, it may be desirable for the rough sides 14 to be less dark to decrease heat absorption from the sun.

While the tiles have been described in relation to FIG. 7 as being used on an exterior of a building, it is noted that tile arrays can be formed within buildings, such as behind glass windows. Indeed, the arrays need not be used in architectural applications at all. Instead, the tiles and/or arrays could simply be used as solar heat exchangers.

While particular tile and array embodiments have been illustrated and described, it is noted that many variations are possible. For example, while the tiles have been described as having two opposed sides, it is noted that the tiles can comprise three or more sides, which increases the number of options in terms of what surface can face outward. While the tiles have been illustrated as being generally square, it is noted that they could be long and narrow like louvers of a vertical or horizontal blind. In addition, one or both sides of the tiles can be curved or can be otherwise non-planar. In other embodiments, the lighter-colored sides of the tiles can also have a rough surface. In such cases, the lighter sides of the tiles can be angled to the sun in a manner in which the surface modulation is self-shading. In similar manner, the darker side can be angled to avoid this effect.

The invention claimed is:

1. A solar tile comprising:
   a hollow body comprising a first side and a second side, the first side including a dark-colored surface that is adapted to absorb solar energy and the second side including a light-colored surface that is adapted to reflect solar energy, the body defining an open interior space through which heat exchange liquid can pass; and
   a central tube that enables the heat exchange liquid to enter or exit the interior space of the body, wherein the central tube also forms a central axis about which the tile can be rotated.

2. The tile of claim 1, wherein the body is generally rectangular.

3. The tile of claim 1, wherein the wherein the dark-colored surface is a rough surface.

4. The tile of claim 3, wherein the rough surface comprises a waffle pattern that includes multiple protrusions that extend outward from the first side.

5. The tile of claim 1, wherein the light-colored surface is a smooth surface.

6. A solar array comprising:
   multiple rows and columns of solar tiles, each tile having a hollow body including a dark-colored first side that is adapted to absorb solar energy, a light-colored second side that is adapted to reflect solar energy, and an open interior space through which heat exchange liquid can pass, each row or each column comprising one or more central tubes that connect adjacent tiles in the row or column together and enable the heat exchange liquid flow from one tile to the next tile in the row or column, the one or more central tubes also forming a central axis about which the tiles of the row or column can be rotated together.

7. The array of claim 6, wherein the first sides have rough outer surfaces.

8. The array of claim 7, wherein the rough outer surfaces each comprise a waffle pattern having multiple protrusions that extend outward from the first side.

9. The array of claim 6, wherein the second sides have smooth outer surfaces.

10. The tile of claim 1, wherein the second side has a convex shape.

11. The array of claim 6, wherein each row or column comprises multiple central tubes that connect adjacent tiles together.

12. The array of claim 6, wherein each row or column comprises a single, continuous central tube that connects each tile of the row or column together.

13. The array of claim 12, wherein the single, continuous central tubes comprise perforations that enable the heat exchange liquid to flow into and out of the interior spaces of the tiles.

14. The array of claim 6, wherein the central tubes connect adjacent tiles of the columns together and wherein the tiles of the columns can be rotated together by rotating the tubes about their vertical axes.

15. The array of claim 6, wherein the central tubes connect adjacent tiles of the rows together and wherein the tiles of the rows can be rotated together by rotating the tubes about their horizontal axes.

* * * * *